March 17, 1942. H. M. PFLAGER 2,276,337

RAILWAY TRUCK STRUCTURE

Filed Aug. 11, 1941 4 Sheets-Sheet 1

INVENTOR.
HARRY M. PFLAGER
BY Rodney Bedell
ATTORNEY

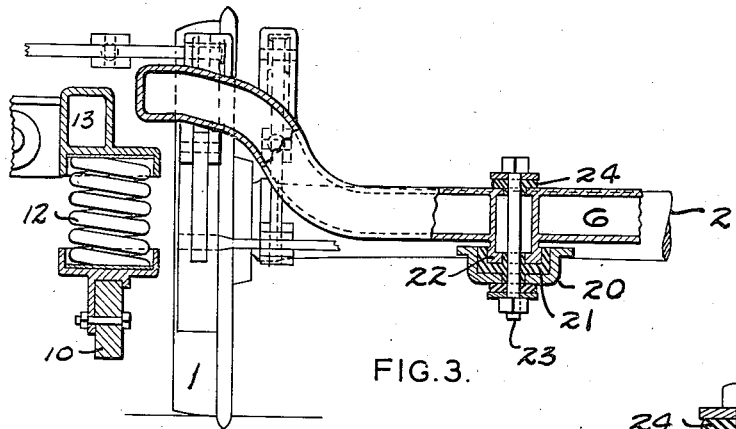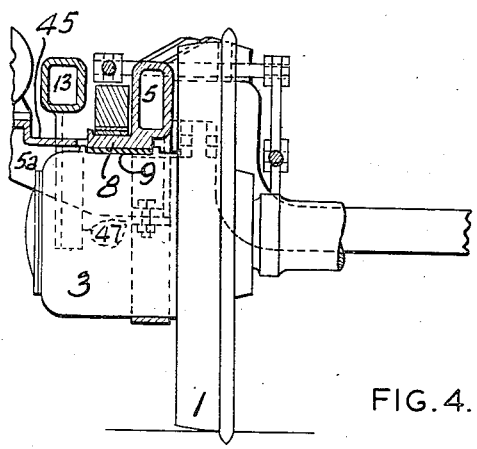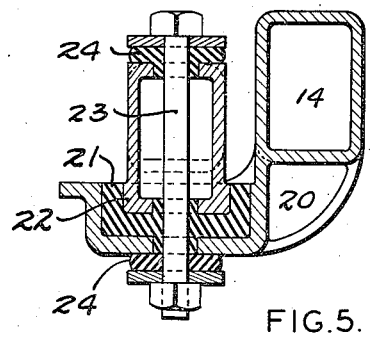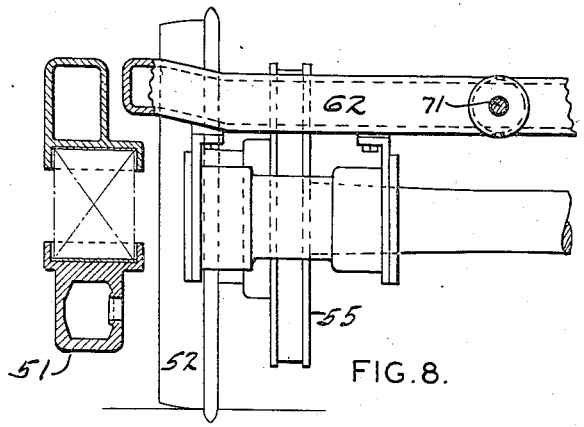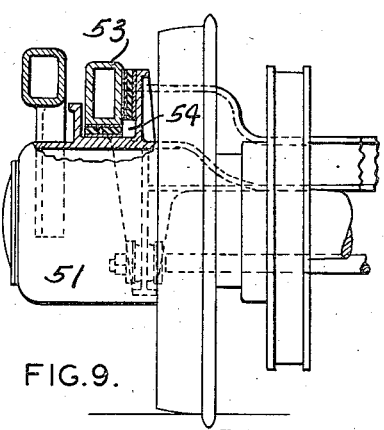

March 17, 1942.  H. M. PFLAGER  2,276,337
RAILWAY TRUCK STRUCTURE
Filed Aug. 11, 1941  4 Sheets-Sheet 3

INVENTOR.
HARRY M. PFLAGER
BY Rodney Bedell
ATTORNEY

March 17, 1942.   H. M. PFLAGER   2,276,337
RAILWAY TRUCK STRUCTURE
Filed Aug. 11, 1941   4 Sheets-Sheet 4

INVENTOR.
HARRY M. PFLAGER
BY Rodney Bedell
ATTORNEY

Patented Mar. 17, 1942

2,276,337

UNITED STATES PATENT OFFICE 2,276,337

RAILWAY TRUCK STRUCTURE

Harry M. Pflager, St. Louis, Mo., assignor to General Steel Castings Corporation, Granite City, Ill., a corporation of Delaware Application August 11, 1941, Serial No. 406,329

24 Claims. (Cl. 188—205)

The invention relates to railway rolling stock and more particularly to the carrying of the brake gear of a railway truck by structure other than the truck frame which carries the vehicle body. The general arrangement resembles that shown in an earlier application by the present inventor filed June 20, 1940, Serial No. 341,409.

In the ordinary railway truck construction, the truck brake levers and the brake beams, including the brake heads and shoes, are supported from the main truck frame and all of the braking forces and reactions are carried directly to the truck frame when the brakes are applied. The truck frame is spring supported from the wheels, axles and journal boxes, and consequently there is vertical movement of the wheels, axles and journal boxes relative to the brake parts carried on the truck frame and applied to the wheels, and further, the application of the brakes tends to affect the free operation of the springs. As the result of this usual construction, brake application disturbances such as chattering, sudden brake hanger pulling forces, and other vibrations and shocks are transferred directly to the truck frame and thence to the vehicle body. Furthermore, the axle journal boxes are held against displacement longitudinally and transversely of the truck frame by engagement with truck frame pedestals, and the engagement of the journal box with the pedestals during the application of the brakes or during the application of other forces applied longitudinally and transversely of the truck causes friction between the journal boxes and pedestals when they move vertically relative to each other, due to spring action, and this produces disagreeable vibrations which are transmitted to the body of the vehicle and also produces wear between the contacting parts.

The main object of the present invention is to avoid sliding action between the journal boxes and the truck frame. This is done not only by carrying brake gear on a frame other than the main truck frame, as shown in the application mentioned above, but also by providing a floating action for the journal boxes, which avoids their direct contact with the truck frame, and by mounting the truck wheels and axles so that they will be held in position, relative to the truck frame, against longitudinal and transverse displacement, by yielding connections which resist and cushion the forces referred to.

Another object of the invention is to provide for the tilting of the brake gear carrying frame, and the parts carried thereby, relative to the truck frame in transverse and longitudinal vertical planes, so that the brake gear carrying frame may tilt with the axles on which it is mounted independently of the tilting of the truck main frame but at the same time the relative positions of the brake frame and main frame longitudinally and laterally of the truck are maintained.

Another object is to mount all of the brake gear, including the operating cylinder, on the truck axle as a unit and substantially independently of the truck frame.

Another object of the invention is to provide a safety means to prevent excessive displacement of the wheels, axles and journal boxes relative to the truck frame in the event of breakage of the equalizers carried on the journal boxes or of the brake frame.

These and other detailed objects of the invention as will be apparent from the following description are attained by the structure illustrated in the accompanying drawings in which—

Figures 3 and 4 are transverse vertical sections taken on the corresponding section lines of Figure 1.

Figure 5 is a detail longitudinal vertical section taken on the line 5—5 of Figure 1.

Figure 6:
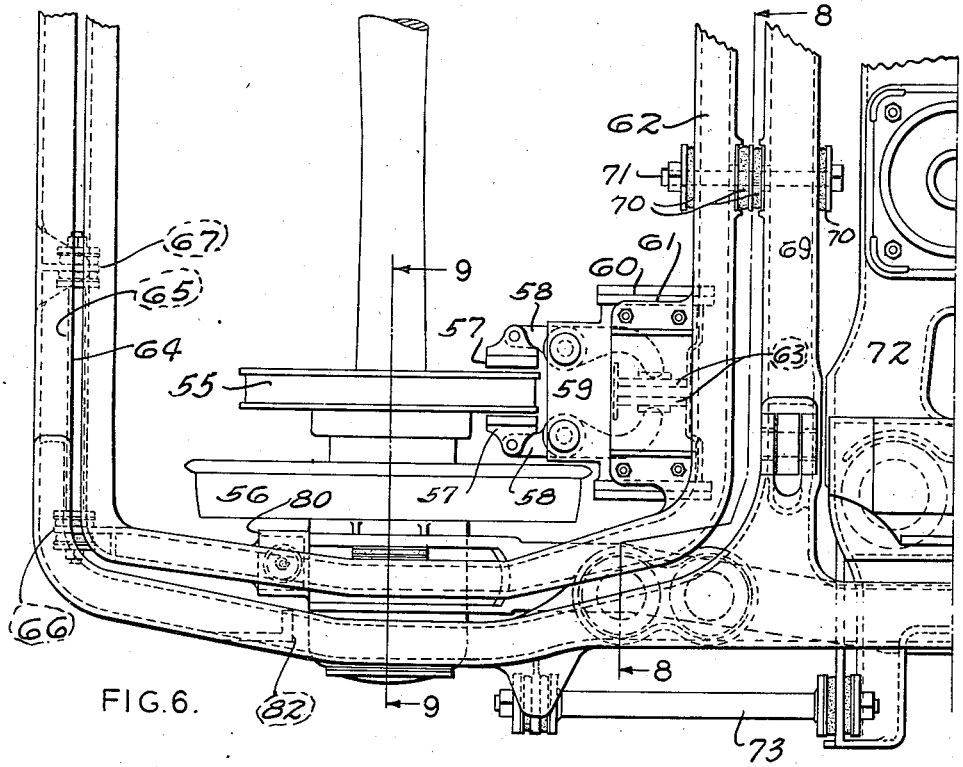
Figure 7:
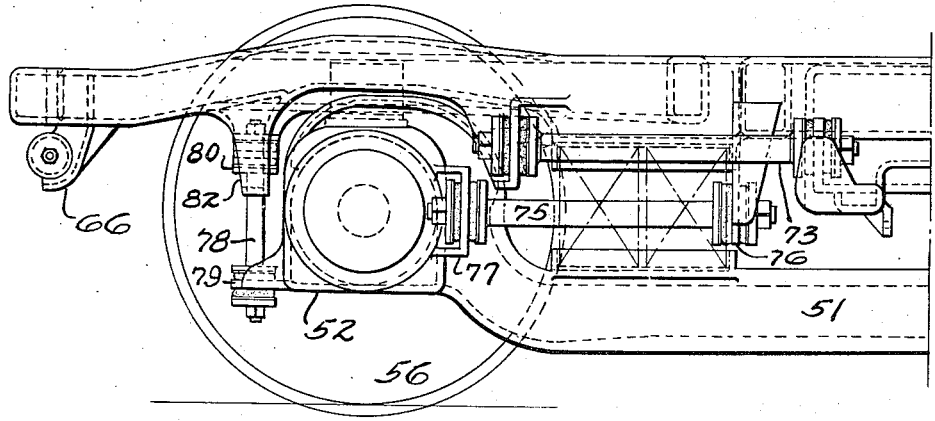

Figures 6–9 correspond to Figures 1–4 but illustrate another form of the invention, Figures 8 and 9 being taken on the corresponding section lines of Figure 6.

Figure 1:
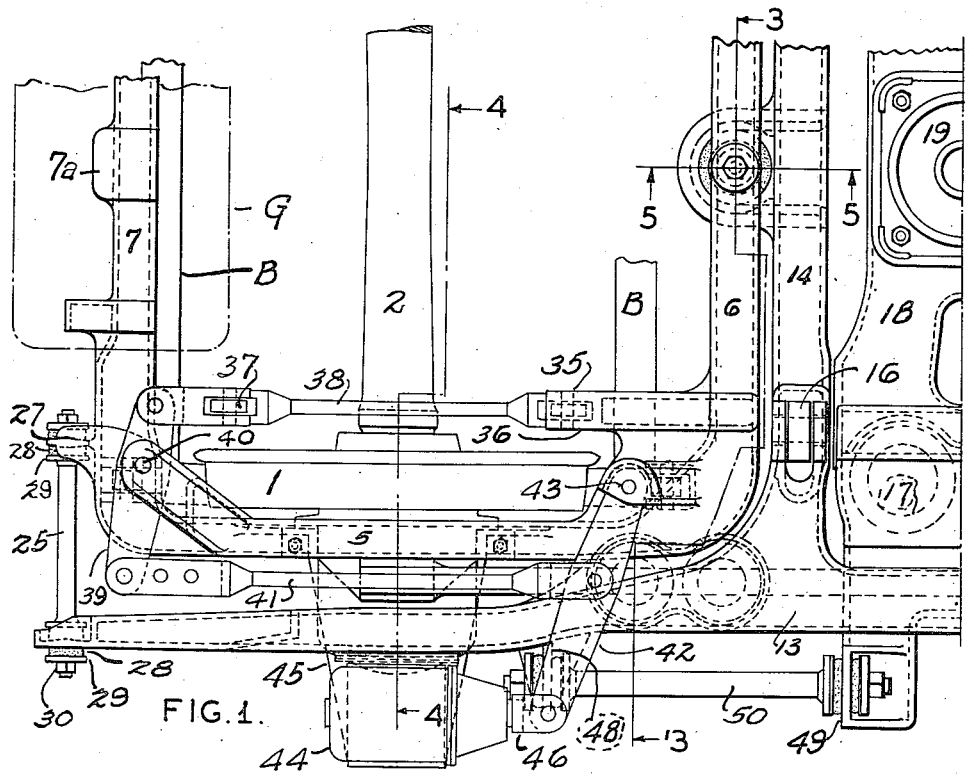
Figure 1 is a top view of one-fourth of a railway four-wheel equalized truck with lateral motion bolster.
Figure 2:
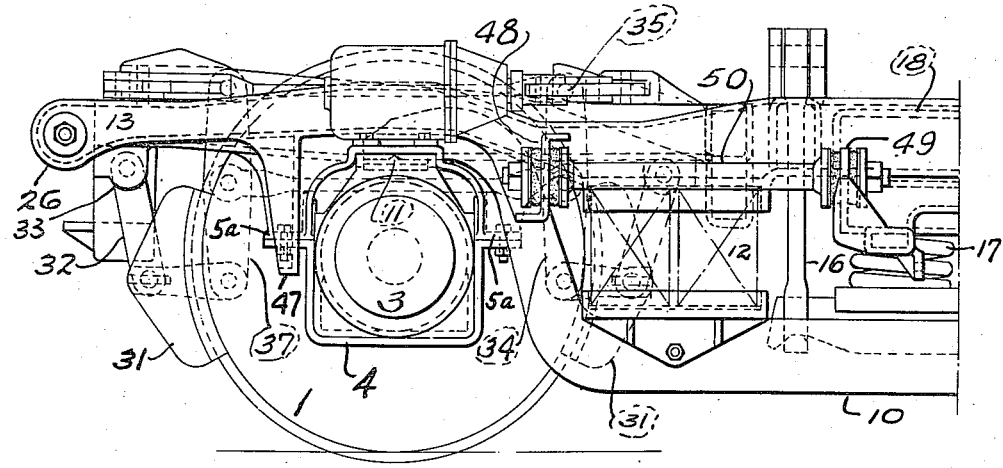
Figure 2 is a side elevation of the structure shown in Figure 1.
Figure 10:
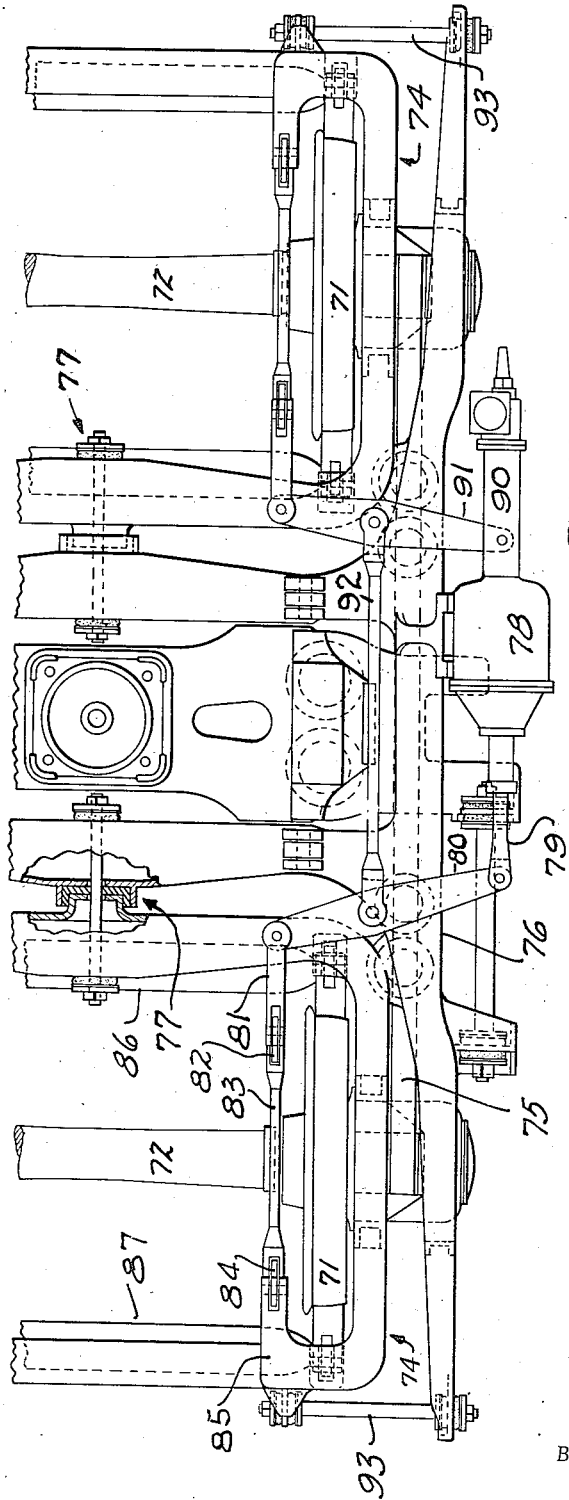
Figure 11:
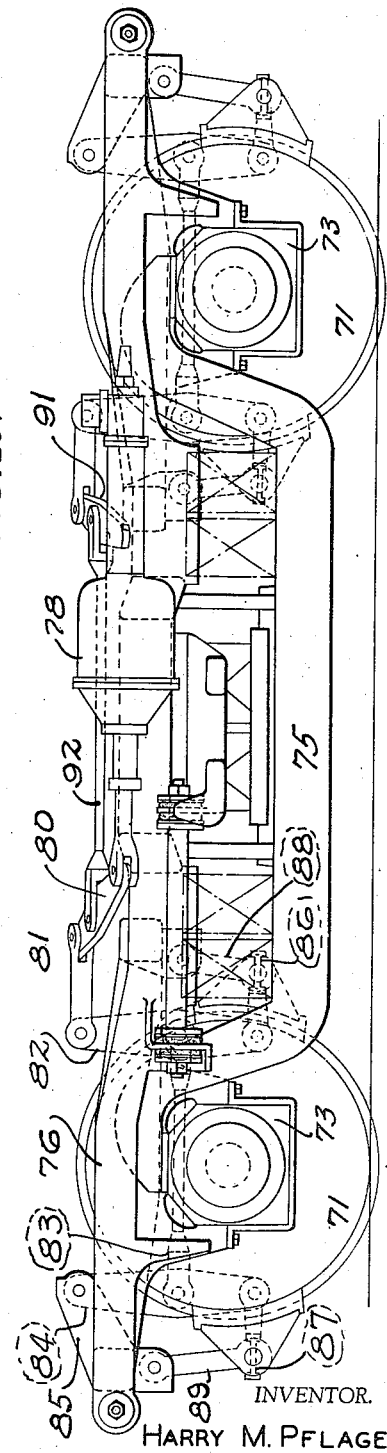

Figures 10 and 11 correspond generally to Figures 1 and 2 but illustrate another form of the invention.

The truck illustrated in Figures 1–5 includes wheels 1, axles 2 and journal boxes 3, all of ordinary construction. A rectangular brake gear carrying frame includes sides 5 connected by transverse members 6 and 7. Horizontal flanges 8 on sides 5 rest on pads 9 of rubber-like material mounted on journal boxes 3.

Each brake frame side member 5 is provided with depending brackets 5a at the sides of the journal box and the latter is provided with a yoke 4 bolted to the lower ends of brackets 5a whereby the box is retained in position.

Drop equalizers 10 have their elevated ends supported on flanges 8, the abutting faces of the flange and equalizer being tongued and grooved as shown at 11 (Figure 2) to hold the equalizer and box against relative longitudinal movement. Truck springs 12 are seated on equalizer 10 and support the truck frame which includes wheel pieces 13 and transverse transoms 14. Swing hangers 16 are pivotally suspended from transoms 14 and support the bolster springs 17 which carry the bolster 18 provided with the usual center plate 19 for mounting the vehicle body, not shown.

Each brake frame and the gear carried thereby is supported primarily by one of the axles, but a stabilizing third point of support is provided on the adjacent truck frame transom 14, as best shown in Figures 3 and 5.

A bracket 20 extends downwardly and laterally of transom 14 and includes a circular pocket preferably fitted with a cup-like cushion 21 of rubber-like material which receives the lower end of a circular boss 22 depending from brake frame transverse member 6. A bolt 23 extends vertically through elements 6, 21, 22 and 20 and yielding washers 24 and maintains the assembly of the brake frame and truck frame at this point.

The rear end of each brake frame side 5 is anchored to the adjacent truck frame wheel piece 13 by an anchor rod 25 extending transversely of the truck with its opposite ends secured to a bracket 26 on the end of the truck frame and a bracket 27 on the rear cross member 7 of the brake frame. The rod includes a central portion extending through the brackets, and pads 28 of rubber-like material compressed between flanges 29 and upright portions of the brackets by the clamping nuts 30.

Elements 20, 21 and 22 yieldingly resist relative movement of the brake frame and truck frame longitudinally of the truck, and these elements, together with the anchor rod 25, yieldingly resist relative movement of the brake frame and truck frame transversely of the truck. All of these elements readily accommodate relative tilting of the brake frame and truck frame in vertical planes extending longitudinally and transversely of the truck so that these frames may move with their respective supports, axles 2 and truck springs 12, independently of the vertical and longitudinal forces set up by the application of the brake heads 31 with their shoes to the wheels. These brake heads are suspended by hangers 32 from brackets 33 on the brake frame.

Preferably the brakes are of the clasp type and the set for each wheel includes beams B, one operated by dead levers 34, fulcrumed at 35 to a bracket 36 on the brake frame, and the other operated by live levers 37, connected to levers 34 by connection rods 38. The upper end of each lever 37 is connected to one end of a horizontal lever 39 fulcrumed at 40 to the brake frame with its other end connected by pull rod 41 to a cylinder lever 42 with one end fulcrumed at 43 on the brake frame. The brake cylinder 44 is mounted on a horizontal shelf 45 between brackets 5a on the brake frame and its piston rod 46 is connected to the other end of lever 42. The outer cross member 7 of the brake frame includes pads 7a for mounting an electric generator G.

Preferably the truck frame has a depending bracket 47 at the outside of each journal box 3 but spaced therefrom. This bracket will not come in contact with the journal box except in the event of breakage of the brake frame or one of the equalizers when bracket 47 will function as a safety device to prevent disassembly of the axle box and frame.

Upstanding brackets 48 and 49 on the truck frame and bolster respectively are connected by an anchor rod 50 corresponding generally to rod 25 and yieldingly resisting and cushioning longitudinal forces between the truck frame and bolster and avoiding direct contact between the bolster and transoms 6. This avoids frictional sliding movement of the bolster and truck frame on each other.

The positioning of the journal boxes in the truck by their mounting in the brake frame and the connections between the brake frame and the truck frame avoid frictional pounding and sliding movement between the journal boxes and truck frame irrespective of retardation or acceleration of the vehicle travel, action of the truck springs, transverse rail shocks, etc.

All of these features produce an easy riding truck free of blows and frictional sliding engagement of parts which otherwise would tend to wear the parts and result in deterioration and, when used on passenger train equipment, discomfort for the passengers.

In the construction shown in Figures 6-9, the arrangement of a separate brake frame and truck frame with yielding connections corresponds generally to that previously described but there are several differences in the construction and connection of these parts.

The equalizers 51 and the journal boxes 52 are cast integral with each other, and each brake frame side 53 rests in a pocket 54 formed in the end of the equalizer-journal-box unit.

The brakes are of the disc type comprising a drum 55 on each axle spaced inwardly from each wheel 56 and engaged at opposite sides by shoes 57 carried by levers 58 fulcrumed on a bracket 59 projecting from a cylinder 60 mounted on a bracket 61 depending from the cross member 62 of the brake frame. Pistons 63 in cylinder 60 move in opposite directions when fluid pressure is permitted between them and thrust the right hand ends of levers 58 away from each other and the left hand ends of these levers and shoes 58 towards each other to engage the axle drum 55.

The truck frame includes a rear cross member 64 and an anchor rod 65 is disposed transversely of the truck between brackets 66 and 67 on the brake frame and truck frame respectively. Rod 65 corresponds to rod 25 previously described.

The point of support for the brake frame cross member 62 on the truck frame transom 69 is by upright pads 70 and a bolt 71 disposed horizontally and longitudinally of the truck and extending through elements 62, 69 and 70. Longitudinal forces applied between bolster 72 and the truck frame are resisted and cushioned by means of anchor rods 73, corresponding to the anchor rods 50 in the arrangement previously described.

Relative longitudinal displacement of the truck frame and the equalizer-journal-box unit is yieldingly resisted and cushioned by an anchor rod 75 secured to a bracket 76 on the frame and a bracket 77 on the box. Relative vertical displacement of the brake frame and journal boxes is yieldingly resisted and cushioned by a yielding anchor rod 78 connected to a bracket 79 on the journal box and a bracket 80 on the brake frame. A bracket 82 depending from the truck side frame is spaced from and opposes the end face of journal box 52 and serves as a safety bracket for maintaining the assembly in the event of breakages of anchor rod 75.

Such a structure is illustrated in Figures 10 and 11 in which the wheels 71, axles 72, journal boxes 73, brake frames 74, equalizers 75 and truck frame 76 correspond generally to similar parts shown in Figures 1-5, but in this form of the invention the connection 77 between the truck frame and brake frames at the longitudinal center line of the truck corresponds to that shown in Figure 6.

A brake operating cylinder 78 is mounted on the truck frame at the middle of the truck. The cylinder piston rod 79 is connected to a horizontal power lever 80 supported on the truck frame with its opposite end connected by a link 81 to the upper end of the brake live lever 82. A connecting rod 83 extends between lever 82 and a dead lever 84 suspended from a bracket 85 on brake frame 74. The lower ends of levers 82 and 84 are connected to the adjacent portions of the brake beams 86 and 87 respectively which are supported from the brake frame by hangers 88 and 89 respectively.

The rear end of cylinder 78 mounts a slack adjuster 90 to which is connected one end of a power lever 91, the opposite end of which is connected to and actuates a set of levers and brakes corresponding to those at the left hand end of the truck. A pull rod 92 connects the intermediate portions of power levers 80 and 91.

The outer end of each brake frame is connected to the adjacent portions of the truck frame by yielding anchor rods 93 similar to the anchor rods 25 shown in Figure 1.

In each form of the invention the positioning of the wheel, axle and journal box units transversely and longitudinally of the truck by mounting the same in the brake frames and avoiding direct contact between these units and the truck frame and the provision of yielding connections between the truck frame and the axle-mounting brake frame result in the avoidance of pounding and frictional sliding contact between the axle units and the truck frame parts due to spring action, accelerating and retarding forces, transverse rail shocks, etc.

Other brake arrangements with all or part of the brake gear mounted on the brake frame may be substituted for those shown and the details of the construction may be modified in other ways than those shown without departing from the spirit of the invention, and the exclusive use of such modifications as come within the scope of the claims is contemplated.

What is claimed is:

1. In a railway truck, a wheeled axle, journal boxes, a pedestalless load carrying frame resiliently supported from said axle, a brake carrying frame including portions supported from opposite end portions of said axle, and yielding connections between said frames resisting and cushioning horizontal forces applied between them and allowing the journal boxes to float in relation to the load carrying frame and without direct contact therewith.

2. In a railway truck, a wheel and axle unit, journal boxes thereon, a truck load carrying frame, means carrying said frame on said journal boxes and including a yielding support for said frame, a brake gear carrying frame, elements directly supporting said brake gear carrying frame from said journal boxes, and means connecting said frames and yieldingly resisting and cushioning horizontal forces between them, said load carrying frame being free of direct contact with said journal boxes.

3. A truck as described in claim 2 in which the connection between the frames is adjacent the longitudinal center line of the truck and accommodates the tilting of the frames vertically relative to each other.

4. A truck as described in claim 2 in which the means connecting said frames comprises a flexible connection adjacent the longitudinal center line of the truck on one side of the axle but spaced inwardly from the axle to accommodate tilting of the frames vertically relative to each other about this point and another flexible connection between said frames spaced outwardly from the axle allowing relative vertical movement of the adjacent parts of said frames, said connections maintaining said frames in longitudinal and transverse positions relative to each other.

5. A truck as described in claim 2 in which the load carrying frame is provided with depending brackets opposing the journal boxes but spaced therefrom to provide a safety means in the event of failure of the truck parts which hold the journal boxes in position in the truck.

6. A truck as described in claim 2 in which the connection between the frames is located at the longitudinal center line of the truck and comprises a boss on one frame fitting into a recess on the other frame, there being a cushioning element between the interfitting parts and yielding to accommodate tilting of the frames vertically relative to each other.

7. A truck as described in claim 2 in which the connection between the frames resists and cushions longitudinal forces applied between the frames.

8. A truck as described in claim 2 in which the connection between the frames resists and cushions forces applied longitudinally and transversely between said frames.

9. A truck as described in claim 2 which also includes a bolster movably supported on the load carrying frame, yielding means connecting said bolster and load carrying frame to resist and cushion forces applied therebetween, while maintaining said frame and bolster in longitudinal relation with each other, and yielding means connecting said load carrying frame and journal boxes to resist and cushion forces transmitted horizontally therebetween, permitting relative vertical movement of said load carrying frame and boxes but maintaining the relation of said journal boxes and load carrying frame longitudinally of the truck.

10. A truck as described in claim 2 which includes a yielding vertical tie between the brake gear carrying frame and the journal boxes.

11. In a railway truck, a wheeled axle, journal boxes, a truck load carrying frame resiliently supported from said axle and including a transverse transom at one side of said axle and spaced therefrom, a brake gear carrying frame including a portion supported from said axle and including a transverse member adjacent said transom and resiliently connected thereto, said brake gear carrying frame also including a transverse member at the opposite side of said axle adjacent to the end of said load carrying frame, and a flexible connection between said latter transverse member and the end of said load carrying frame, said connections permitting free relative vertical movement of said frames but maintaining the relative positions of said frames transversely of the truck.

12. In a railway truck, a wheeled axle, journal boxes, a truck load carrying frame resiliently supported from said axle and including a transverse transom at one side of said axle and spaced therefrom, a brake gear carrying frame including portions supported from said axle and including a transverse member adjacent said transom and a transverse member at the opposite side of said axle adjacent the end of said truck frame, a connection between the center of said transom and the adjacent transverse member of said load carrying frame and yieldingly resisting and cushioning forces applied longitudinally and transversely between said frames, and a connection between the other transverse member of the brake gear carrying frame and the adjacent end of the truck frame and resisting and cushioning forces exerted transversely between said frames, said connections providing for the tilting of said frames vertically relative to each other.

13. In a railway truck, a wheeled axle, journal boxes thereon, a brake gear carrying frame mounted directly on said journal boxes and movable with the same and with said axle, equalizers supported from said journal boxes, springs on said equalizers, a truck frame carried on said springs and movable thereon relative to said brake gear carrying frame and journal boxes vertically of the truck, and yielding means connecting said frames to maintain them in relation with each other while permitting vertical tilting relative to each other.

14. A truck as described in claim 2 which also includes a bolster movably supported on the load carrying frame, and means yieldingly connecting said bolster and the load carrying frame for resisting and cushioning forces exerted between said bolster and load carrying frame longitudinally of the truck.

15. A truck as described in claim 2 in which the connection between the frames is located at the longitudinal center line of the truck and comprises a pad of rubber-like material between opposing elements of the frames, and a bolt extending horizontally and longitudinally of the truck through said frames and clamping said pad between said frames.

16. In a railway truck, spaced wheel and axle units, journal boxes thereon, a truck load carrying frame resiliently supported from said units, an individual brake gear carrying frame for each unit and including portions supported from the journal boxes of that unit, means connecting said load carrying frame to said brake gear carrying frames and yieldingly resisting and cushioning horizontal forces between them, said load carrying frame being free of direct contact with said journal boxes and said individual frames.

17. In a railway truck, spaced wheel and axle units, journal boxes thereon, equalizers extending between boxes at the same side of the truck, each of said equalizers and the corresponding boxes comprising a single rigid unit, truck springs supported from said equalizers, a load carrying frame mounted on said truck springs and movable vertically relative to said equalizers and boxes, a brake gear carrying frame supported by said boxes and said load carrying frame, and means flexibly connecting said frames and allowing free vertical movement between said journal boxes and truck without direct contact with the latter.

18. In a railway truck, a wheel and axle unit, journal boxes thereon, a truck load carrying frame resiliently supported from said unit, a brake gear carrying frame including portions supported from said unit, each of said frames extending at opposite sides of said unit, and a device at each side of said unit yieldingly connecting the adjacent portions of said frames and resisting and cushioning horizontal forces exerted between them.

19. A truck as described in claim 2 which includes a brake operating power device mounted on the brake gear carrying frame.

20. A truck as described in claim 2 which includes brake elements applicable to the wheel and axle unit and supported by said brake gear carrying frame and brake applying means including lever structure fulcrumed on said brake gear carrying frame and connected to said brake elements independently of said load carrying frame.

21. In a railway truck, a wheel and axle unit, journal boxes thereon, a truck load carrying frame resiliently supported from said boxes but free of contact therewith, a brake gear carrying frame including portions supported on said boxes, brake elements applicable to said unit and supported by said brake carrying frame, and brake applying means supported by said brake carrying frame and including a power device, and lever structure fulcrumed on said brake gear carrying frame and connected to said brake elements independently of said load carrying frame, said frames being yieldingly connected to each other at opposite sides of said axle.

22. A truck as described in claim 2 which includes brake elements applicable to the wheel and axle unit and supported by the brake gear carrying frame, and a brake operating power device supported by the truck load carrying frame, there being an operative connection between said device and said brake elements.

23. A truck as described in claim 16 which includes elements applicable to each of said wheel and axle units and supported from the brake gear carrying frames, a brake gear operating power device supported on said truck load carrying frame, and operative connections between the same and the brake elements for both units.

24. In a railway truck, a wheel and axle unit, journal boxes thereon, a brake carrying frame supported from said journal boxes, a pedestalless load carrying frame yieldingly supported from said journal boxes, a connection between said frames at a point spaced longitudinally of the truck from said journal boxes and stabilizing the support of said brake carrying frame on said journal boxes, yielding connections between said frames resisting and cushioning horizontal forces applied between them and allowing the journal boxes to float in relation to the load carrying frame and without direct contact therewith, brake gear elements mounted on said brake carrying frame and applicable to said wheels, and power operating means for said elements mounted on said load carrying frame.

H. M. PFLAGER.